Patented Mar. 8, 1932

1,848,213

UNITED STATES PATENT OFFICE

WILLIAM BRYAN WIEGAND, OF SOUND BEACH, CONNECTICUT

HIGH COLOR CARBON BLACK

No Drawing. Application filed September 7, 1929. Serial No. 391,102.

This invention relates to a new carbon black product having improved properties with respect to dispersion in media such as the fluid component of lacquers, paints, enamels and the like.

The improved carbon black product of my invention consists essentially of carbon black and a minor proportion of a stable amine or of a soap of a stable amine. My invention includes such products including certain particularly efficacious amines.

Carbon black is a colloid and as such requires for stable dispersion a proper relation between the charges upon the colloidal particles and the media in which it is dispersed. I have found, however, that the adsorptive capacity of carbon black itself disturbs this relation. I have further found that the tendency of the adsorptive capacity of carbon black to disturb this proper relation in dispersions of carbon black can be inhibited by incorporating in the carbon black an appropriate dispersing agent. I believe the efficacy of these dispersing agents may in part be due to a tendency to reduce interfacial tension within the dispersion.

The dispersing agents I have found particularly useful include triethanolamine, diphenylguanidine, diorthotolylguanidine, phenylorthotolylguanidine and the soaps, or esters, of these amines with fatty acids such as oleic acid, palmitic acid and stearic acid. The soaps of these amines with resin acids are also useful.

The incorporation of from 1 to 5%, approximately, of one of these dispersing agents in carbon black produces a carbon black product having markedly improved properties with respect to dispersion in the usual fluid components of lacquers, paints, enamels and the like. The exact proportion producing optimum results varies, not only with different dispersing agents but also with different dispersing media, but the range of proportions just stated is a range within which optimum results are frequently secured and in which good results are usually secured.

The dispersing agent may be incorporated in the carbon black in any convenient manner. For example, the dispersing agent may be dissolved in a volatile solvent, this solution then mixed with the carbon black, and the carbon black then dried. Diphenylguanidine may be so incorporated in carbon black in solution in ethyl alcohol. Similarly, a solution of the dispersing agent may be sprayed on the carbon black and the carbon black then dried. Or the dispersing agent may be triturated with part of the carbon black and this carbon black with the dispersing agent distributed therethrough, then mixed with the remainder of the carbon black. I have used all of these methods.

The dispersion of carbon black in cellulose ester lacquers has hitherto offered such difficulty as to limit the utility of this pigment in such lacquers. The improved carbon black product of my invention is of special utility as a pigment in cellulose ester lacquers. Of the dispersing agents mentioned above, I have found diorthotolylguanidine and the soaps of diorthotolylguanidine to be particularly efficacious in the carbon black products of my invention to be used in cellulose ester lacquers.

In referring to a "stable" amine, I refer to those amines which are sufficiently stable not to be subject to autodecomposition within the range of ordinary atmospheric temperatures, or within the range of temperature to which the carbon black product may be heated during incorporation of the dispersing agent, as during drying.

In its broad aspect, my invention comprises the provision of a carbon black product consisting essentially of carbon black and a dispersing agent incorporated in the carbon black.

I claim:

1. As a component of lacquers, paints and enamels a carbon black product consisting essentially of carbon black and an incorporated minor proportion of a dispersing agent comprising a stable amine.

2. As a component of lacquers, paints and enamels a carbon black product consisting essentially of carbon black and an incorporated minor proportion of a dispersing agent comprising a soap of a stable amine.

3. As a component of lacquers, paints and enamels a carbon black product consisting essentially of carbon black and an incorporated minor proportion of a dispersing agent comprising a guanidine.

4. As a component of lacquers, paints and enamels a carbon black product consisting essentially of carbon black and an incorporated minor proportion of a dispersing agent comprising a soap of a guanidine.

5. As a component of lacquers, paints and enamels a carbon black product consisting essentially of carbon black and an incorporated minor proportion of a dispersing agent comprising diorthotolylguanidine.

6. As a component of lacquers, paints and enamels a carbon black product consisting essentially of carbon black and an incorporated minor proportion of a dispersing agent comprising a soap of diorthotolylguanidine.

In testimony whereof I affix my signature.

WILLIAM BRYAN WIEGAND.